United States Patent
Jaw et al.

(10) Patent No.: US 8,358,463 B2
(45) Date of Patent: Jan. 22, 2013

(54) MICRO PARTICLE IMAGE VELOCIMETRY, AND PARTICLE IMAGE-CAPTURING METHOD THEREOF

(75) Inventors: Shenq-Yuh Jaw, Keelung (TW);
 Jyh-Jong Sheen, Keelung (TW);
 Tsu-Hung Huang, Keelung (TW)

(73) Assignee: National Taiwan Ocean University (TW)

( * ) Notice: Subject to any disclaimer, the term of this patent is extended or adjusted under 35 U.S.C. 154(b) by 706 days.

(21) Appl. No.: 12/545,581

(22) Filed: Aug. 21, 2009

(65) Prior Publication Data

US 2010/0194875 A1 Aug. 5, 2010

(30) Foreign Application Priority Data

Feb. 5, 2009 (TW) .............................. 98103654 A

(51) Int. Cl.
 *G02B 21/06* (2006.01)
(52) U.S. Cl. .................. 359/385; 359/387; 359/390

(58) Field of Classification Search .................. 359/385, 359/387
See application file for complete search history.

(56) References Cited

U.S. PATENT DOCUMENTS

| 7,542,203 B2* | 6/2009 | Vodyanoy et al. ............. 359/387 |
| 7,551,349 B2* | 6/2009 | Vodyanoy et al. ............. 359/385 |
| 2007/0014002 A1* | 1/2007 | Vodyanoy et al. ............. 359/387 |
| 2007/0127117 A1* | 6/2007 | Vodyanoy et al. ............. 359/385 |
| 2010/0046276 A1* | 2/2010 | Chen et al. .................... 365/154 |

* cited by examiner

*Primary Examiner* — Khanh Dinh

(74) *Attorney, Agent, or Firm* — Choate, Hall & Stewart LLP; Charles E. Lyon; Jeffrey S. Pelligrino

(57) ABSTRACT

A particle image-capturing method includes controlling a light-emitting diode unit to emit light so as to illuminate a fluid through an annular condenser, particles in which scattering the light, and controlling an image-capturing unit to capture images of the scattered light through a microscope. A micro particle image velocimetry that performs the method is also disclosed.

8 Claims, 5 Drawing Sheets

MICRO PARTICLE IMAGE VELOCIMETRY, AND PARTICLE IMAGE-CAPTURING METHOD THEREOF

CROSS-REFERENCE TO RELATED APPLICATION

This application claims priority of Taiwanese Application No. 098103654, filed on Feb. 5, 2009, which is incorporated herein in its entirety by reference.

BACKGROUND OF THE INVENTION

1. Field of the Invention

This invention relates to a micro particle image velocimetry, and a particle image-capturing method therefor.

2. Description of the Related Art

Velocity field is one of the most important parameters in analyzing characteristics of fluid motion. In a conventional intrusive method for measuring a velocity field of fluid flow, a probe is dipped in fluid. The intrusion of the probe into the fluid, however, affects the fluid motion, thus causing interference and resulting in an inaccurate measurement. To solve this problem, a non-intrusive method for measuring a velocity field of fluid flow using a particle image velocimetry (PIV) has been proposed.

As the trend toward measurement of microfluids advances, micro-PIVs have been developed. The conventional micro-PIV is based on the setup of the PIV, and includes a double pulse laser, a double exposure mode charge-coupled device (CCD) camera, a microscope, and an analyzer. In a conventional non-intrusive method for measuring a velocity field of fluid flow using the conventional micro-PIV, the double-pulse laser emits light to illuminate fluid and, at the same time, the double exposure mode CCD camera captures two particle images illuminated by the two laser pulses. The analyzer measures a velocity field of the fluid based on a successive pair of images captured by the CCD camera.

Although the aforementioned conventional micro-PIV achieves its intended purpose, the double-pulse laser thereof emits intense and flashing lights, which are harmful to the user's eyes. The intense flashing laser light also causes the particle image to be over-exposed, and hence filters are generally required to reduce the brightness of the images captured by the CCD camera. In addition, the double-pulse laser is expensive and bulky, and incurs high maintenance costs.

SUMMARY OF THE INVENTION

Therefore, an object of the present invention is to provide a particle image-capturing method that can overcome the aforesaid drawbacks of the prior art.

Another object of the present invention is to provide a micro particle image velocimetry that can overcome the aforesaid drawbacks of the prior art.

According to an aspect of the present invention, a particle image-capturing method comprises controlling a light-emitting diode unit to emit light so as to illuminate fluid through an annular condenser, wherein particles in the fluid scatter the light, and controlling an image-capturing unit to capture images of the scattered light through a microscope.

According to another aspect of the present invention, a micro particle image velocimetry (micro-PIV) comprises an annular condenser, a light source, a microscope, an image-capturing unit, and an analyzer unit. The light source includes a light-emitting diode (LED) unit that emits light so as to illuminate a fluid through the annular condenser, wherein particles in the fluid scatter the light. The microscope includes an object lens. The image-capturing unit captures images of the scattered light through the microscope. The analyzer unit is coupled to the image-capturing unit, measures a velocity field of the fluid flow based on the images captured by the image-capturing unit, and presents the velocity field measured thereby.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
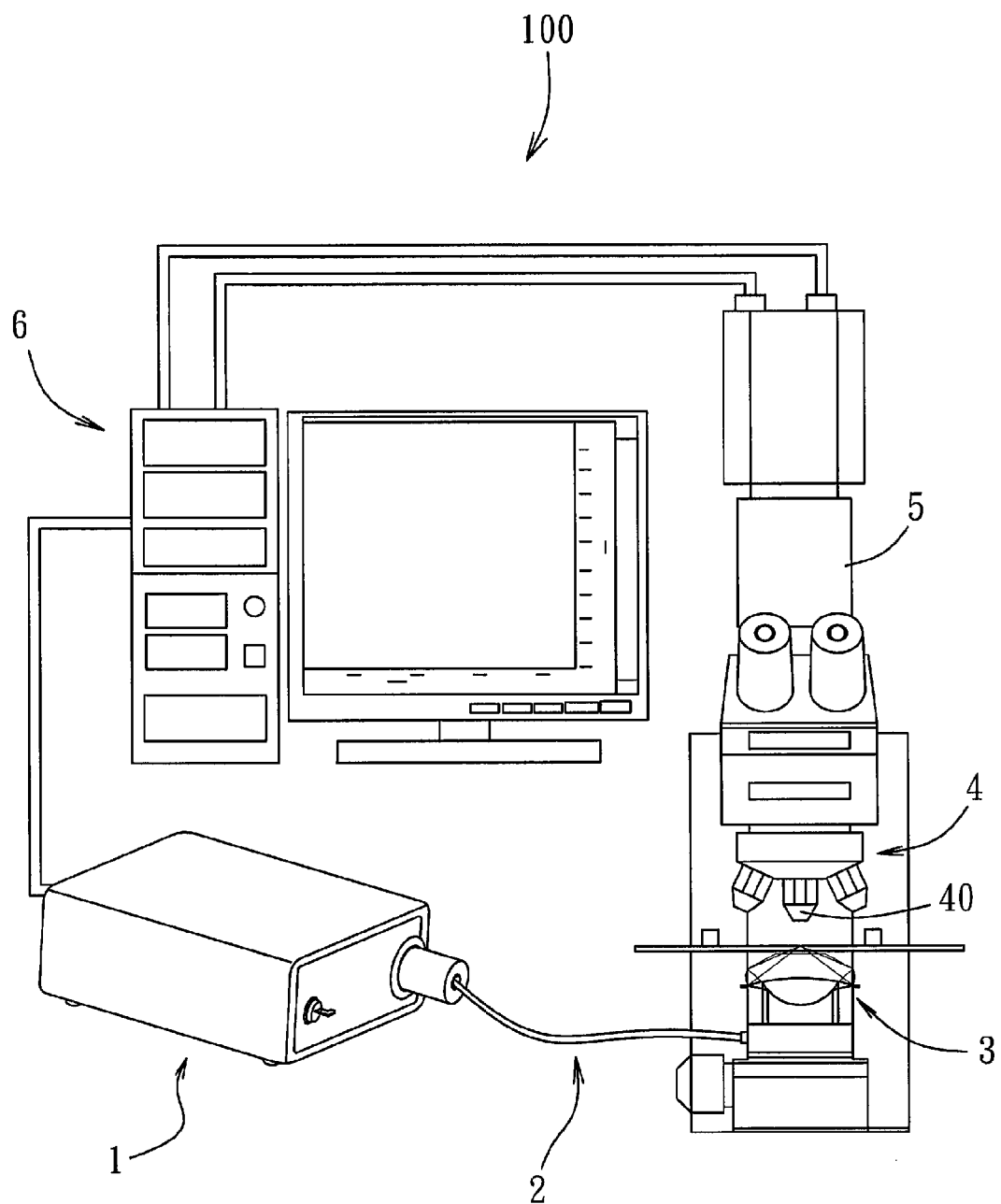
FIG. 1 is a schematic diagram of an embodiment of a micro particle image velocimetry (micro-PIV)

Before embodiments of the present invention are described in greater detail, it should be noted that like elements are denoted by the same reference numerals throughout the disclosure.

Figure 2:
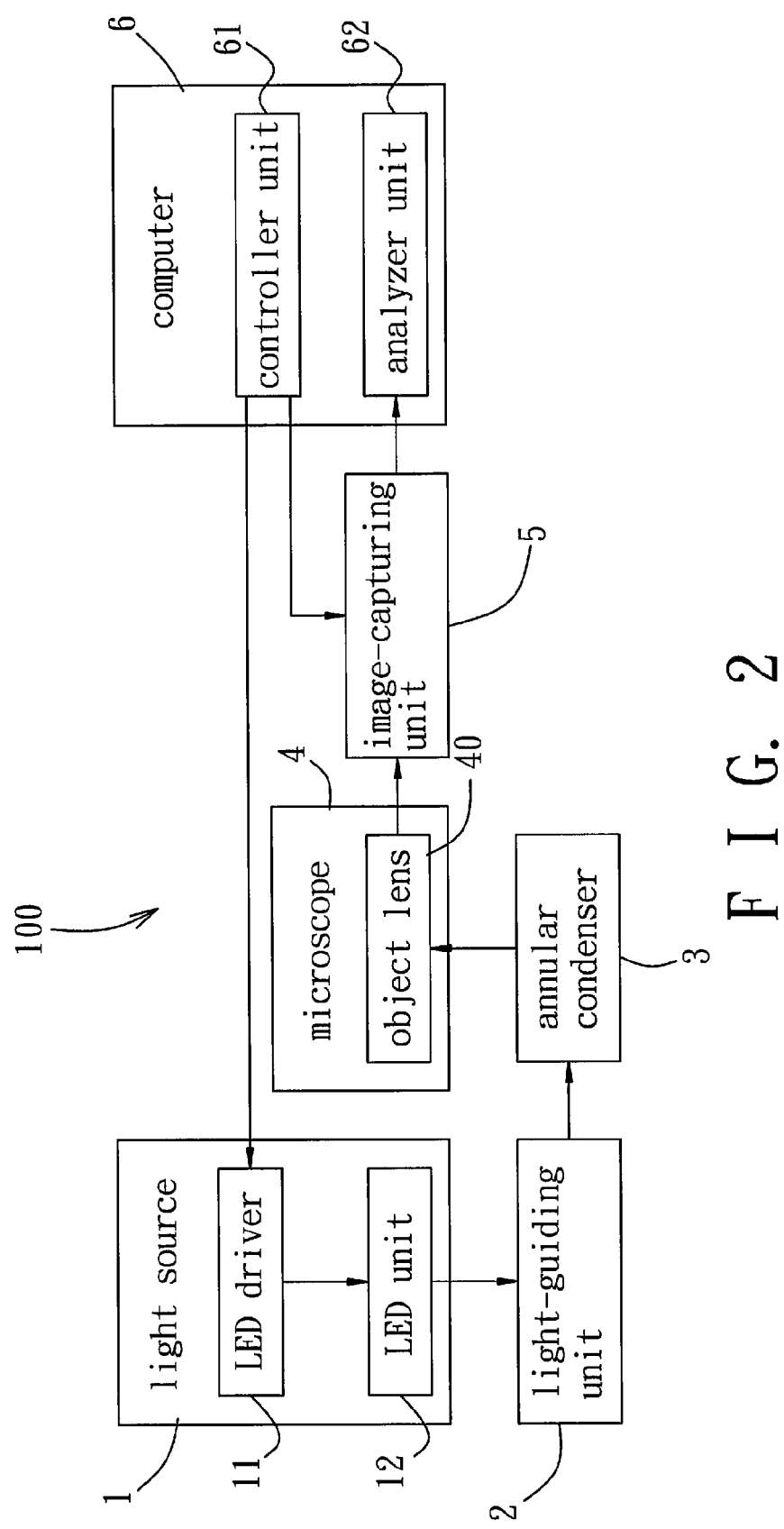
FIG. 2 is a schematic block diagram illustrating a light source, an image-capturing unit, a microscope, a controller unit, an analyzer unit, and an annular condenser of the embodiment of FIG. 1.

Referring to FIGS. 1 and 2, an embodiment of a micro particle image velocimetry (micro-PIV) 100 is shown to include an annular condenser 3, a light source 1, a microscope 4, an image-capturing unit 5, and an analyzer unit 62.

The annular condenser 3 is disposed below a plane where fluid is located.

The light source 1 includes a light-emitting diode (LED) unit 12, and an LED driver 11 connected to the LED unit 12.

The light source 1 further includes a light-guiding unit 2 that is connected between the LED unit 12 and the annular condenser 3 and that guides the light emitted by the LED unit 12 to the annular condenser 3. In this embodiment, the light-guiding unit 2 includes a fiber optic cable.

In another embodiment, the fiber optic cable is dispensed with, and the LED unit 12 is mounted on the annular condenser 3.

The LED driver 11 drives the LED unit 12 to emit light so as to illuminate the fluid through the annular condenser 3 via the light-guiding unit 2, wherein the particles in the fluid scatter the light.

The microscope 4 includes a plurality of object lenses 40 (only one is shown) disposed above the plane where the fluid is located.

In some embodiments, the microscope 4 may be an inverted microscope.

The annular condenser 3 focuses light on the plane where the fluid is located such that only the light scattered by the particles in the fluid is received by the object lenses 40 of the microscope 4. In many embodiments, the annular condenser 3 is of the type CytoViva high-resolution adaptor.

The image-capturing unit 5 captures images of the scattered light through the microscope 4. In this embodiment, the image-capturing unit 5 is a PIV double exposure charged-coupled device (CCD) camera.

In another embodiment, the image-capturing unit 5 is a high-speed camera.

The micro-PIV 100 further includes a controller unit 61 that is installed in a computer 6, that is connected to the LED driver 11 of the light source 1 and the image-capturing unit 5, and that simultaneously controls, such as by sending control signals, the LED driver 11 to drive the LED unit 12 and the image-capturing unit 5 to capture images of the scattered light. In this embodiment, the controller unit 61 includes software, such as the laboratory visual instrumentation engineering workbench (LabVIEW), and a data acquisition card, such as the National Instruments DAQ6251.

The analyzer unit 62 is in the form of software, is installed in the computer 6, is coupled to the image-capturing unit 5, measures a velocity field of the fluid flow based on the images captured by the image-capturing unit 5, and presents the velocity field measured thereby.

In measuring the velocity field of the fluid flow, the analyzer unit 62 first uses a cross-correlation function to obtain displacement information of a particle based on a succeeding pair of the images captured by the image-capturing unit 5, and then divides the particle displacement obtained thereby by a time interval between the succeeding pair of the images captured by the image-capturing unit 5 to obtain particle velocity.

It is noted that the analyzer unit 62 may measure directions of the particles based on the succeeding pairs of the images captured by the image-capturing unit 5 using also the aforementioned cross-correlation function.

Figure 3:
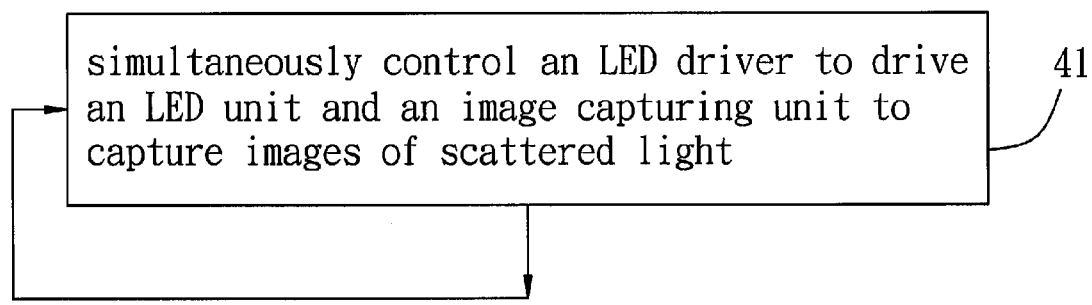
FIG. 3 is a flow chart of an embodiment of a particle image-capturing method using the micro-PIV shown in FIG. 1.

An embodiment of a particle image-capturing method to be implemented using the aforementioned micro-PIV 100 will now be described with further reference to FIG. 3.

In step 41, the controller unit 61 simultaneously controls the LED driver 11 to drive the LED unit 12 and the image-capturing unit 5 to capture images of the scattered light.

In this embodiment, step 41 may be repeated twice such that step 41 is performed for a duration of 300 microseconds, i.e., the image-capturing unit 5 is exposed for a duration of 300 microseconds, and such that the time interval between repetitions is 500 microseconds, i.e., the time interval between the images captured by the image-capturing unit 5 is 500 microseconds.

Figure 4:
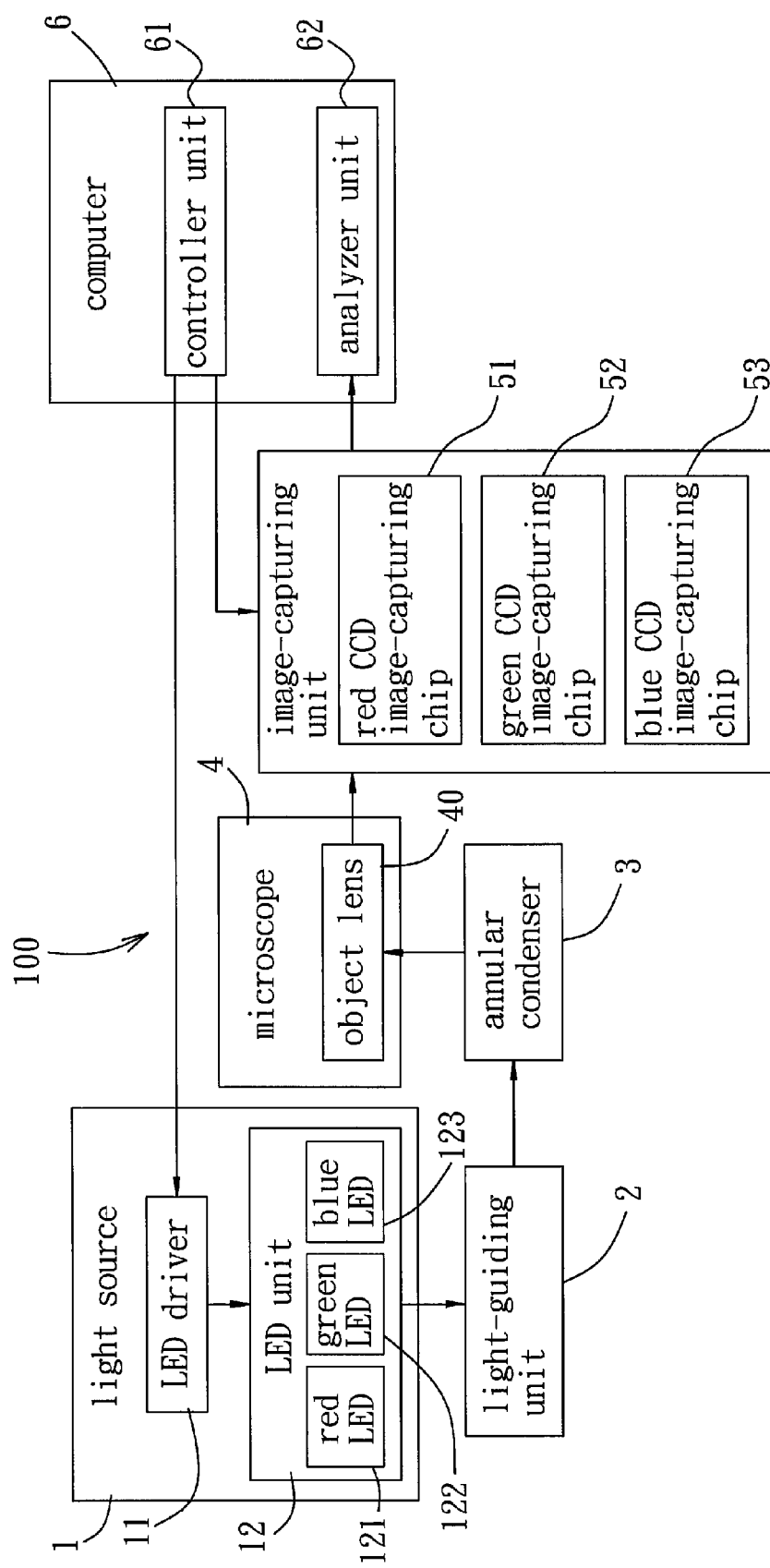
FIG. 4 is a schematic block diagram of another embodiment of a micro-PIV according to this invention.

FIG. 4 illustrates another embodiment of a micro-PIV 100. When compared to the previous embodiment, in this embodiment, the LED unit 12 includes red, green, and blue LEDs 121, 122, 123, each of which emits a respective one of red, green, and blue light.

The image-capturing unit 5 is a color 3-CCD digital video camera, and includes red, green, and blue CCD image-capturing chips 51, 52, 53. In this embodiment, the red, green, and blue CCD image-capturing chips 51, 52, 53 have the same resolution.

Figure 5:
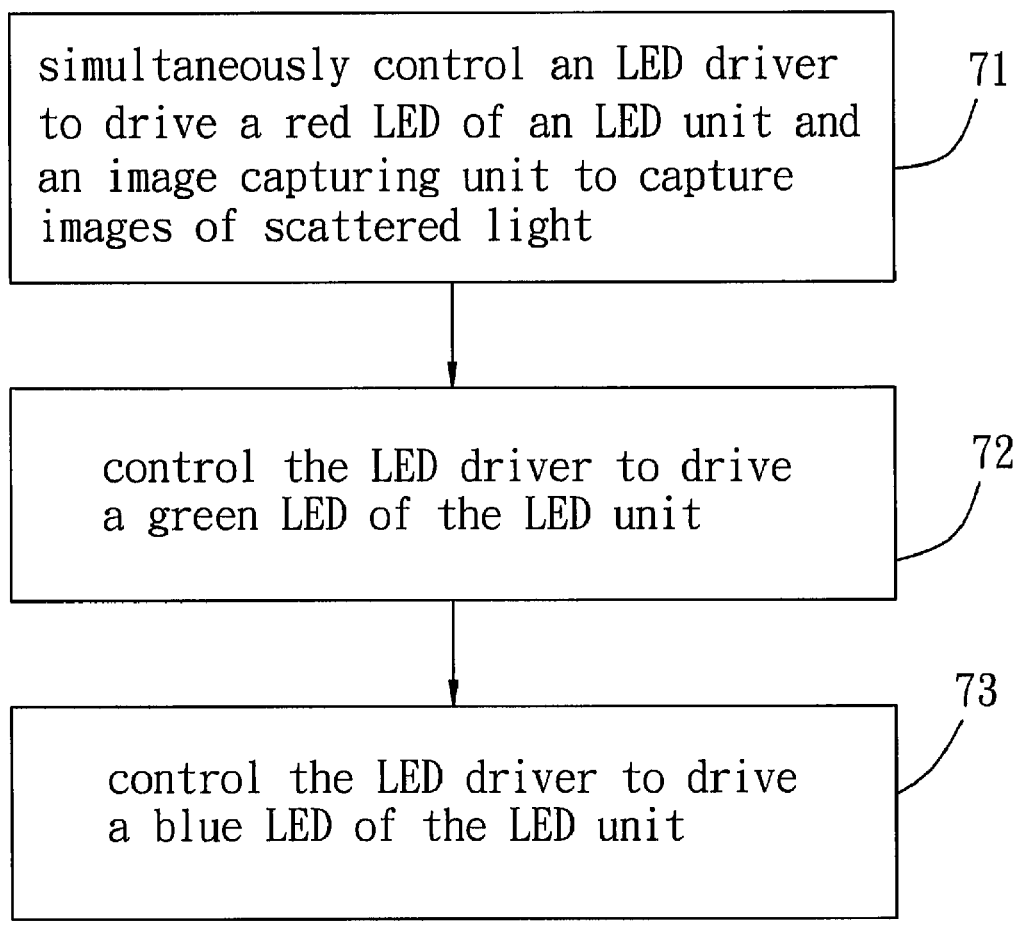
FIG. 5 is a flow chart of an embodiment of a particle image-capturing method using the micro-PIV shown in FIG. 4.

This embodiment of a particle image-capturing method using the aforementioned micro-PIV 100 will now be described with further reference to FIG. 5.

In step 71, the controller unit 61 simultaneously controls the LED driver 11 to drive the red LED 121 of the LED unit 12 and the color digital video camera 5 to capture images of the scattered light.

In this step, a particle image reflected by the red light is recorded in the red CCD image-capturing chip 51 of the color digital video camera 5 at high image intensity. The green and blue CCD image-capturing chips 52, 53 of the color digital video camera 5 are not sensitive to the red light, and hence a noise level particle image reflected by the red light is recorded in each of the green and blue CCD image-capturing chips 52, 53 at low intensity.

In step 72, the controller unit 61 controls the LED driver 11 to drive the green LED 122 of the LED unit 12.

In this step, the shutter of the color digital video camera 5 is still open so that a second exposure of the particle image reflected by the green light is recorded in the green CCD image-capturing chip 52 at high image intensity. The red and blue CCD image-capturing chips 51, 53 of the color digital video camera 5 are not sensitive to the green light, and hence a noise level particle image reflected by the green light is recorded in each of the red and blue CCD image-capturing chips 51, 53 at low intensity.

In step 73, the controller unit 61 controls the LED driver 11 to drive the blue LED 123 of the LED unit 12.

In this step, the shutter of the color digital video camera 5 is still open so that a third exposure of the particle image reflected by the blue light is recorded in the blue CCD chip at high image intensity. The red and green CCD image-capturing chips 51, 52 of the color digital video camera 5 are not sensitive to the blue light, and hence a noise level particle image reflected by the blue light is recorded in each of the red and green CCD image-capturing chips 51, 52 at low intensity.

It is noted that by setting an appropriate threshold, the red, green, and blue triple-exposure particle image can be separated into three individual red, green, and blue sequential particle images.

The velocity field may be analyzed from sequential pairs of the images captured by the image-capturing unit 5.

It has thus been shown that the micro-PIV 100 of embodiments of this invention includes the LED unit 12 instead of a double pulse laser, and therefore overcomes drawbacks of the conventional micro-PIV 100. Moreover, embodiments of the micro-PIV 100 of this invention includes the annular condenser 3 that enhances the signal-to-noise ratio of the images captured by the image-capturing unit 5.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A particle image-capturing method, comprising:
   A) controlling a light-emitting diode unit to emit light so as to illuminate fluid through an annular condenser, wherein particles in the fluid scatter the light; and
   B) controlling an image-capturing unit to capture images of the scattered light through a microscope;
   wherein steps A) and B) are performed simultaneously and repeatedly in one cycle of operation, and
   the light-emitting diode unit emits a respective distinct color each time step A) is repeated in one cycle of operation.

2. The particle image-capturing method as claimed in claim 1, wherein:
   steps A) and B) are performed thrice in one cycle of operation, and
   the light-emitting diode unit emits a distinct one of red, green, and blue light each time step A) is performed in one cycle of operation.

3. A micro particle image velocimetry (micro-PIV), comprising:
   an annular condenser;
   a light source including a light-emitting diode (LED) unit configured to emit light so as to illuminate fluid through said annular condenser, wherein
the LED unit includes
a plurality of LEDs, each LED of the plurality of LEDs being configured to emit a respective distinct color, and
an LED driver that is coupled to the LED unit, wherein the LED driver is configured to drive the LED unit to emit light,
wherein particles in the fluid scatter the light;
a microscope including an object lens;
an image-capturing unit configured to capture images of the scattered light through said microscope;
a controller unit coupled to the LED driver and the image-capturing unit, wherein the controller unit is configured to simultaneously control
the LED driver to sequentially drive the plurality of LEDs of the LED unit, and
the image-capturing unit to capture images of the scattered light; and
an analyzer unit coupled to said image-capturing unit, wherein the analyzer unit is configured to measure a velocity field of the fluid flow based on the images captured by said image-capturing unit, and present the velocity field measured thereby.

4. The micro-PIV as claimed in claim 3, wherein said light source further includes a light-guiding unit that is coupled between said LED unit and said annular condenser, wherein the light-guiding unit is configured to guide the light emitted by said LED unit to said annular condenser.

5. The micro-PIV as claimed in claim 4, wherein said light-guiding unit includes a fiber optic cable.

6. The micro-PIV as claimed in claim 3, wherein said controller unit is configured to control said LED driver to drive said LED unit intermittently.

7. The micro-PIV as claimed in claim 3, wherein each LED of said plurality of LEDs is configured to emit a distinct one of red, green, and blue light.

8. The micro-PIV as claimed in claim 7, wherein said image-capturing unit is a color 3-CCD digital video camera, and includes red, green, blue CCD image-capturing chips.

* * * * *